United States Patent
Ohno

(10) Patent No.: US 7,142,777 B1
(45) Date of Patent: Nov. 28, 2006

(54) RECORDING AND REPRODUCING APPARATUS AND METHOD GENERATING RECORDING LOCATION TABLE FOR PLURALITY OF PROGRAMS RECEIVED IN MULTIPLEXED DATA TRAIN

(75) Inventor: Tomoyuki Ohno, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,340

(22) Filed: Feb. 22, 2000

(30) Foreign Application Priority Data

Feb. 23, 1999 (JP) ............................. 11-045506
Feb. 22, 2000 (JP) ............................. 2000-044571

(51) Int. Cl.
*H04N 5/91* (2006.01)
(52) U.S. Cl. ........................................ 386/95; 386/125
(58) Field of Classification Search ............... 386/1, 386/33, 45, 69, 70, 81, 82, 6–8, 111–112, 386/95; 348/385.1, 386.1, 387.1, 474, 423.1, 348/460, 461; *H04N 5/76, 5/781, 9/79, 7/12, H04N 11/02, 11/04, 7/00, 11/00, 7/08, 7/084, H04N 7/087*
See application file for complete search history.

(56) References Cited

U.S. PATENT DOCUMENTS 5,613,032 A * 3/1997 Cruz et al. .................. 386/69
5,619,337 A * 4/1997 Naimpally .................. 386/83
5,778,136 A * 7/1998 Hirayama et al. ........... 386/52
5,844,595 A * 12/1998 Blatter et al. ............... 455/83
6,002,834 A * 12/1999 Hirabayashi et al. ........ 386/70
6,016,172 A * 1/2000 Huh ..................... 375/240.27
6,169,843 B1 * 1/2001 Lenihan et al. ............. 386/46
6,185,228 B1 * 2/2001 Takashimizu et al. ..... 370/535
6,463,059 B1 * 10/2002 Movshovich et al. ...... 370/389
6,925,247 B1 * 8/2005 Kim et al. ................... 386/68

FOREIGN PATENT DOCUMENTS

| EP | 0 685 845 A2 | 12/1995 |
|---|---|---|
| EP | 0 757 349 A2 | 2/1997 |
| EP | 0 849 958 A2 | 6/1998 |

OTHER PUBLICATIONS

European Search Report dated Dec. 13, 2005.

* cited by examiner

*Primary Examiner*—Huy Nguyen
(74) *Attorney, Agent, or Firm*—Fitzpatrick, Cella, Harper & Scinto

(57) ABSTRACT

An apparatus for receiving a data train multiplexing a plurality of programs each constituted of a plurality of transmission packets and recording the received data train in a storage medium, generates a storage location table storing storage location data of a predetermined transmission packet in the storage medium among a plurality of transmission packets of each program in the data train.

5 Claims, 17 Drawing Sheets

| PACKET | KIND OF DATA | PID |
|---|---|---|
| PMT1 | PROGRAM MAP TABLE 1 | 0000000010001=0X0011 |
| PMT2 | PROGRAM MAP TABLE 2 | 0000000010010=0X0012 |
| PMT3 | PROGRAM MAP TABLE 3 | 0000000010011=0X0013 |
| TS1-V | VIDEO DATA OF PROGRAM NUMBER 1 | 0000000010100=0X0014 |
| TS2-V | VIDEO DATA OF PROGRAM NUMBER 2 | 0000000010110=0X0016 |
| TS3-V | VIDEO DATA OF PROGRAM NUMBER 3 | 0000000011000=0X0018 |
| TS1-A | AUDIO DATA OF PROGRAM NUMBER 4 | 0000000010101=0X0015 |
| TS2-A | AUDIO DATA OF PROGRAM NUMBER 2 | 0000000010111=0X0017 |
| TS3-A | AUDIO DATA OF PROGRAM NUMBER 3 | 0000000011001=0X0019 |

FIG. 3

| INDEX | PID | REPRODUCTION TIME MANAGEMENT INFORMATION | DATA STORAGE INFORMATION | DATA STORAGE 2 INFORMATION |
|---|---|---|---|---|
| 0X00000000 | 0X0014 | 0X0020 | * * * * * * | # # # # # # |
| 0X00000001 | 0X0016 | 0X0021 | * * * * * * | # # # # # # |
| 0X00000002 | 0X0018 | 0X0022 | * * * * * * | # # # # # # |
| 0X00000003 | 0X0014 | 0X0023 | * * * * * * | # # # # # # |
| 0X00000004 | 0X0016 | 0X0024 | * * * * * * | # # # # # # |
| 0X00000005 | 0X0018 | 0X0025 | * * * * * * | # # # # # # |
| 0X00000006 | 0X0014 | 0X0026 | * * * * * * | # # # # # # |
| 0X00000007 | 0X0016 | 0X0027 | * * * * * * | # # # # # # |
| 0X00000008 | 0X0018 | 0X0028 | * * * * * * | # # # # # # |
| 0X00000009 | 0X0014 | 0X0029 | * * * * * * | # # # # # # |
| 0X0000000A | 0X0016 | 0X002A | * * * * * * | # # # # # # |
| 0X0000000B | 0X0018 | 0X002B | * * * * * * | # # # # # # |
| 0X0000000C | 0X0014 | 0X002C | * * * * * * | # # # # # # |
| 0X0000000D | 0X0016 | 0X002D | * * * * * * | # # # # # # |
| 0X0000000E | 0X0018 | 0X002E | * * * * * * | # # # # # # |
| 0X0000000F | 0X0014 | 0X002F | * * * * * * | # # # # # # |
| 0X00000010 | 0X0016 | 0X0030 | * * * * * * | # # # # # # |
| 0X00000011 | 0X0018 | 0X0031 | * * * * * * | # # # # # # |
| 0X00000012 | 0X0014 | 0X0032 | * * * * * * | # # # # # # |
| 0X00000013 | 0X0016 | 0X0033 | * * * * * * | # # # # # # |
| 0X00000014 | 0X0018 | 0X0034 | * * * * * * | # # # # # # |

FIG. 5

| INDEX | DATA STORAGE INFORMATION | DATA STORAGE 2 INFORMATION |
|---|---|---|
| 0X00000000 | * * * * * * | # # # # # # |
| 0X00000001 | * * * * * * | # # # # # # |
| 0X00000002 | * * * * * * | # # # # # # |
| 0X00000003 | * * * * * * | # # # # # # |
| 0X00000004 | * * * * * * | # # # # # # |
| 0X00000005 | * * * * * * | # # # # # # |
| 0X00000006 | * * * * * * | # # # # # # |
| 0X00000007 | * * * * * * | # # # # # # |
| 0X00000008 | * * * * * * | # # # # # # |
| 0X00000009 | * * * * * * | # # # # # # |
| 0X0000000A | * * * * * * | # # # # # # |
| 0X0000000B | * * * * * * | # # # # # # |
| 0X0000000C | * * * * * * | # # # # # # |
| 0X0000000D | * * * * * * | # # # # # # |
| 0X0000000E | * * * * * * | # # # # # # |
| 0X0000000F | * * * * * * | # # # # # # |
| 0X00000010 | * * * * * * | # # # # # # |
| 0X00000011 | * * * * * * | # # # # # # |
| 0X00000012 | * * * * * * | # # # # # # |
| 0X00000013 | * * * * * * | # # # # # # |
| 0X00000014 | * * * * * * | # # # # # # |

FIG. 9

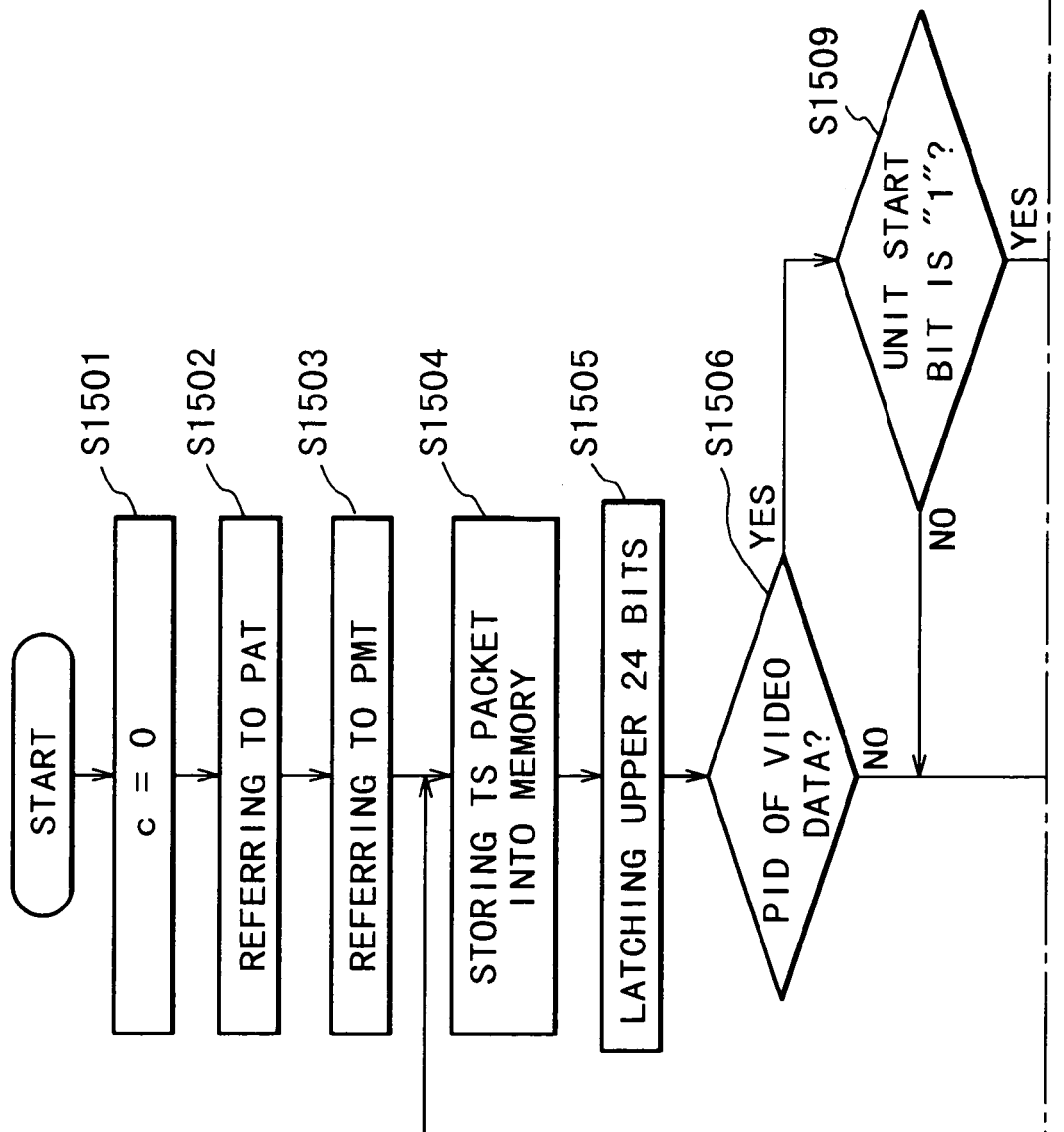

RECORDING AND REPRODUCING
APPARATUS AND METHOD GENERATING
RECORDING LOCATION TABLE FOR
PLURALITY OF PROGRAMS RECEIVED IN
MULTIPLEXED DATA TRAIN

BACKGROUND OF THE INVENTION

1. Field of the Invention

The present invention relates to a recording and reproducing apparatus, and more particularly to an apparatus for recording and reproducing television signals of a plurality of multiplexed programs each constituted of a plurality of packets.

2. Related Background Art

Digital television (hereinafter described as digital TV) broadcasting for broadcasting television signals as digital signals has been proposed recently, and in Japan, it is realized already as CS (Communication Satellite) broadcasting.

An apparatus for receiving digital TV broadcasting signals and recording and reproducing them will be described.

FIG. 16 is a block diagram showing an apparatus for receiving digital TV broadcasting signals and recording and reproducing them.

In FIG. 16, a digital TV signal received by a tuner 1601 is input via an input line 161 to an SW circuit 1603 and a data control circuit 1615. The data control circuit 1615 counts and stores a bit rate of the received data, and controls a data storage 1617 via a control line 1621-9 to store the received data via an input line 170. The data storage 1617 may be a hard disk, a large capacity semiconductor memory, an optical recording device, a magnetic recording device or the like.

While the received data is recorded, the received data may be divided, decoded and output. Namely, the received data input to the SW circuit 1603 via the input line 161 is selected by the SW circuit 1603 and input to a demultiplexer 1605 via an input line 162.

The demultiplexer 1605 picks up only the data of a designated program in accordance with an ID in the received data, and divides it into a video data train and an audio data train. Video data is input via a video data line 163 to a video decoding unit 1607, and audio PES packet data is input via an audio PES data line 164 to an audio decoding unit 1609.

The video decoding unit 1607 decodes the input video data train in a manner corresponding to the encoding executed when the data was transmitted, and outputs the decoded data to a video control unit 1611. The video control unit 1611 converts the decoded video data into a format suitable for external apparatus which is not shown, and outputs it via an output line 167. The audio decoding unit 1609 decodes the input audio data train in a manner corresponding to the encoding executed when the data was transmitted, and outputs the decoded data to an audio control unit 1613. The audio control unit 1613 converts the decoded audio data into a format suitable for an unrepresented external apparatus, and outputs it via an output line 168.

Next, an operation of reproducing data recorded in the data storage 1617 will be described.

The data control unit 1615 controls the data storage 1617 via the control line 1621 or the like to read the recorded digital TV data and outputs it to the SW circuit 1603 via an input line 169 at the bit rate stored in the data control unit 1615 when the TV data was received. When the digital TV data recorded in the data storage 1617 is divided, decoded and output, the SW circuit 1603 selects the data input via the input line 169. The selected data is input to the demultiplexer 1605 via the input line 162. The operation to follow is the same as described above.

The recording and reproducing apparatus described above is, however, associated with some problem. Namely, since the received data is recorded in or reproduced from the data storage on the program unit basis, when the data recorded in the data storage is reproduced, it is only possible either to reproduce the data from the start of a program or to reproduce the data from a proper position (in the unit of a management file of the data storage) intermediately of the recorded TS packet. The data cannot be reproduced from the position desired by a user, i.e., a so-called random access reproduction is impossible.

SUMMARY OF THE INVENTION

It is an object of the invention to solve the above-described problem.

It is another object of the invention to provide an apparatus capable of facilitating random access reproduction when recorded digital TV signals of a plurality of multiplexed programs are reproduced.

It is a further object of the present invention to provide an apparatus capable of reproducing data of one program constituted of a plurality of packets from any desired position.

Under the above objects, according to an aspect of the present invention, there is provided a recording apparatus comprising: receiving means for receiving a data train multiplexing a plurality of programs each having a plurality of transmission packets; recording means for recording the received data train in a recording medium; and generating means for generating a recording location table of recording location data as to a recording location of a predetermined transmission packet in the storage medium among a plurality of transmission packets of each program in the data train.

The other objects and features of the present invention will become more apparent from the following detailed description of embodiments when read in conjunction with the accompanying drawings.

BRIEF DESCRIPTION OF THE DRAWINGS

FIG. 3 is a diagram showing an example of PID shown in FIGS. 2A, 2B, 2C and 2D.

FIG. 5 is a diagram showing an example of TSAT according to an embodiment of the invention.

FIG. 9 is a diagram showing TSAT according to the second embodiment of the invention.

DETAILED DESCRIPTION OF THE PREFERRED EMBODIMENTS

Preferred embodiments of the invention will be described with reference to the accompanying drawings.

In the embodiments to follow, the invention is applied to an apparatus for receiving digital TV broadcasting signals and recording and reproducing them.

First, data to be used by the embodiments will be described.

In the embodiments, digital TV signals of video data, audio data and other data are transmitted and received in the form of a transport stream (hereinafter described as TS) of MPEG 2. The basic data unit is a transport stream packet (hereinafter described as TS packet) having a fixed length of 188 bytes. All data is transmitted by this TS packet, irrespective of the types of data, such as video data, audio data and other data. One TS is generally made of a plurality of programs time divisionally multiplexed. These TSs same in number as the number of transponders are transmitted at the same time.

Figure 2:
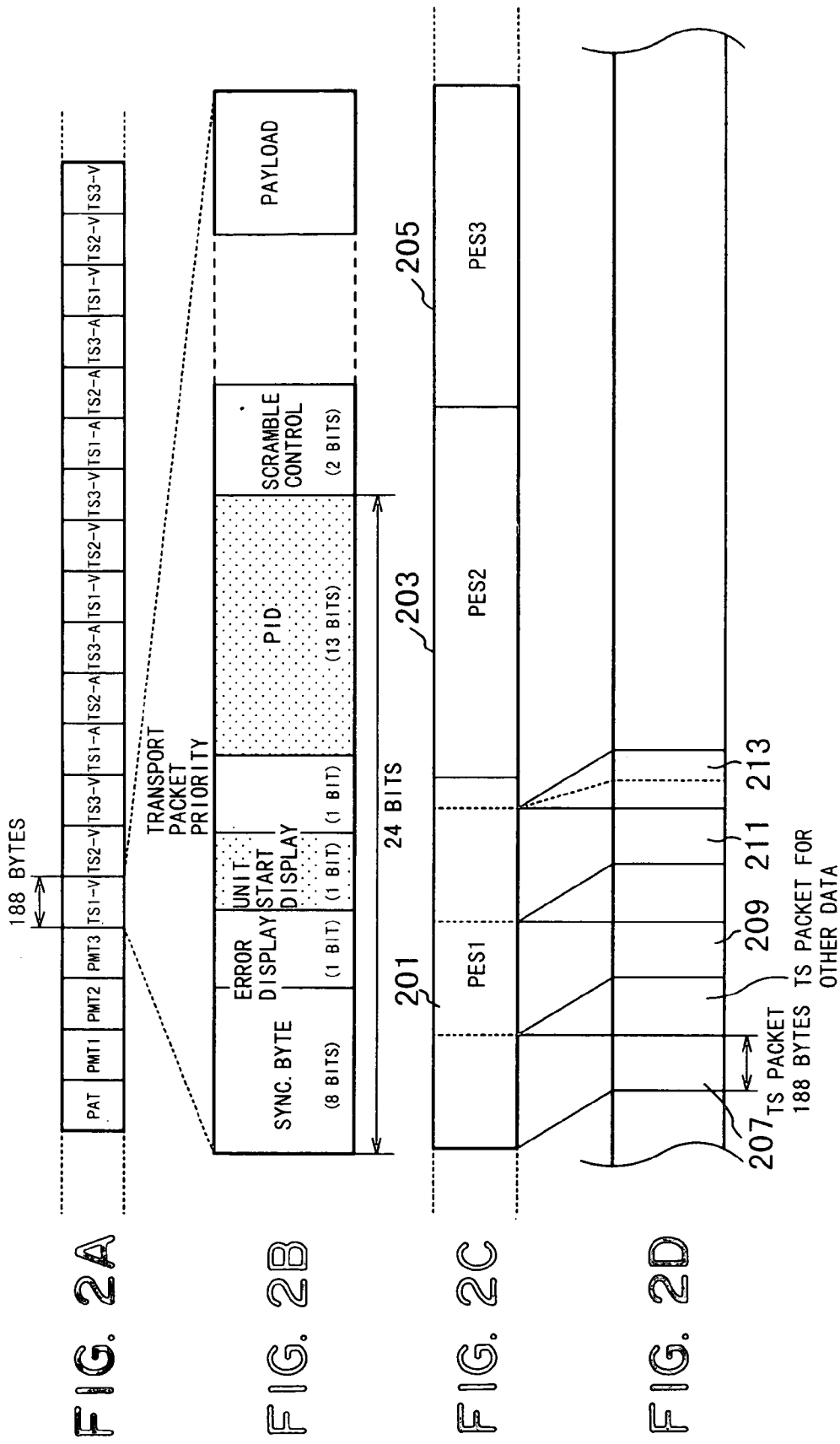
FIGS. 2A, 2B, 2C and 2D are diagrams showing data to be used by the embodiments of the invention.

FIG. 2A shows an example of TS packet data of MPEG 2 in which three programs including video and audio data are encoded and time divisionally multiplexed in accordance with the formats defined in ISO/IEC 13818-1 (system), ISO/IEC 13818-2 (video) and ISO/IEC 13818-3 (audio).

In FIG. 2A, PAT is a program association table, PMT1 is a program map table of a program number 1, PMT2 is a program map table of a program number 2, PMT3 is a program map table of a program number 3, TS1-V is video TS packet data of the program number 1, TS1-A is audio TS packet data of the program number 1, TS2-V is video TS packet data of the program number 2, TS2-A is audio TS packet data of the program number 2, TS3-V is video TS packet data of the program number 3, and TS3-A is audio TS packet data of the program number 3.

Of these data, PAT and PMT are data called PSI (Program Specific Information) and are mainly used for simple tuning operation and program selecting operation.

Each of PAT, PMT and TS packet data has PID (Packet Identification) of 13 bits by which the contents of data can be identified. PAT describes PID of PMT, and PMT describes PID of each of various TS packets such as video, audio and other data of each program contained in TS. An example of PID is shown in FIG. 3.

Different PID numbers are assigned to video and audio data of the same program. It is defined that PAT is assigned PID="0000000000000=0X0000". PID of each PMT is designated in a payload of PAT. PID of each of the video and audio packet data is designated by each PMT.

FIG. 2B shows the structure of TS packet data. Each TS packet has data of 188 bytes including a TS header of top 24 bits, scramble control data of next 2 bits, and the payload such ad video and audio data of remaining bits.

Data such as video, audio data and other data of TS of MPEG 2 is transmitted in the unit called a PES (Packetized Elementary Stream) packet. For example, in digital TV broadcasting, video data of 1 GOP of 15 frames from an I picture to the B picture immediately before the next I picture is encoded, and one PES packet is constituted of the encoded video data of 1 GOP. Therefore, the start frame of each PES is always the I picture, i.e., intra-encoded.

FIG. 2C shows three PES packets PES1 to PES3 constituting the video data of the program number 1. Generally, each of video and image data of one program is divided into a plurality of PES packets.

Each PES packet has a different length, and as shown in FIGS. 2C and 2D, one PES packet is divided into a plurality of TS packets which are then transmitted.

More specifically, in FIGS. 2C and 2D, it is shown that a PES1 packet 201 is divided into a plurality of TS packets 207, 209, 211 and 213 which are then transmitted.

Each PES packet data has one bit of unit start indicator data (payload_unit_start_indicator in ISO/IEC 13818-1) of the TS packet data IS. This unit start indicator data indicates that a new PES packet starts from the payload of the corresponding TS packet.

Namely, data of one PES is the data in the payloads of the TS packets from the TS packet having the unit start indicator data "1" to the TS packet immediately before the next TS packet having the unit start indicator data "1". One set of PES packet data is constituted of the payload data of the TS packets including the TS packet having the unit start indicator data "1" and the succeeding n TS packets having the same PID.

The transmission interval of TS packet data having the same PID and the unit start indicator bit or payload_unit_start indicator "1" is determined by television broadcasting institutes in the case of television broadcasting. In this embodiment, for the convenience of description, it is assumed that TS packet data is transmitted at an interval of 5 minutes. If one PES packet is constituted of encoded video data of 1 GOP as described above, the TS packet having the unit start indicator data "1" is essentially transmitted at an interval shorter than 5 minutes.

An apparatus of receiving such digital TV signals and recording and reproducing them will be described.

Figure 1:
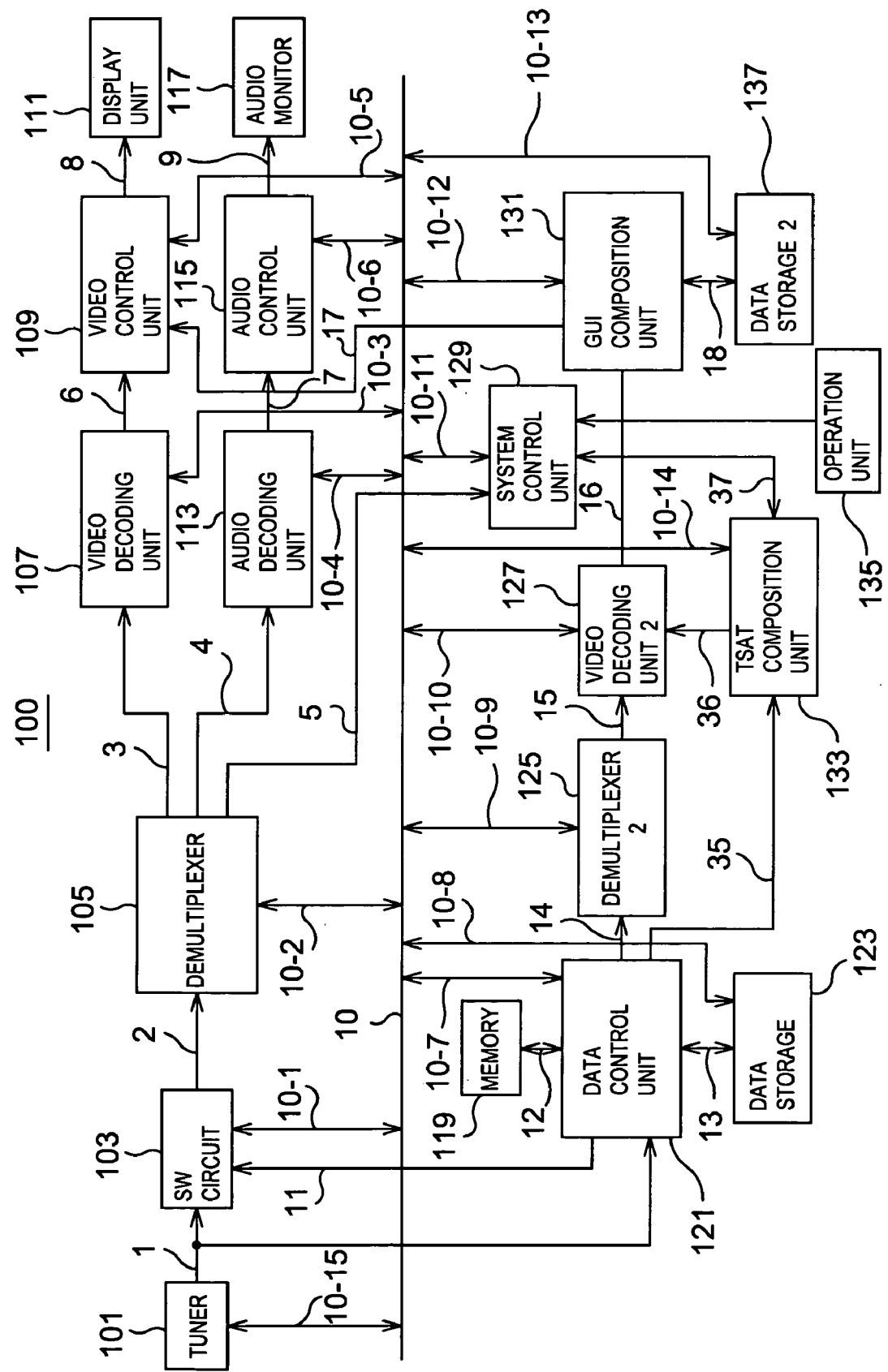
FIG. 1 is a block diagram showing the structure of a recording and reproducing apparatus embodying the invention.

FIG. 1 is a diagram showing a recording and reproducing apparatus according to an embodiment.

Referring to FIG. 1, a tuner 101 receives a digital TV signal in accordance with an instruction supplied via a control line 10-15, to output TS data including the program tuned by an operation unit 135 to an SW circuit 103. TS packet data of time divisionally multiplexed video and audio data of a plurality of programs such as shown in FIGS. 2A to 2D is supplied to a TS input line 1.

When TS packet data is received and reproduced in a usual manner, the SW circuit 103 supplies the TS packet data input via the TS input line 1 to a demultiplexer 105 via a TS data line 2. The demultiplexer 105 divides only the TS packet data having the designated PID supplied from a system control unit 129 via a control line 10-2.

Each TS packet divided by the demultiplexer 105 is generally transferred as PES packet data defined in ISO/IEC 13818-1. Video packet data is supplied to a video decoding unit 107 via a video PES data line 3, and audio PES packet data is supplied via an audio PES data line 4 to an audio decoding unit 113.

The video decoding unit 107 is controlled via a control line 10-3 by a system controller 129, and performs a decoding process of MPEG 2 for the input video PES packet data to output the decoded video data to a video control unit 109 via a decoded video data line 6. The video control unit 109 is controlled via a control line 10-5 by the system controller 129, and converts the decoded video data into a format suitable for a display unit 111, e.g., the NTSC format, to output the display video data to the video display unit 111 via a display video data line 8. As will be later described, the video control unit 109 executes various GUI processes generated by a GUI (Graphical User Interface) composition unit 131 and outputs the results to the display unit 111.

The audio decoding unit 113 is controlled via a control line 10-4 by the system controller 129, and performs a decoding process of MPEG 2 for the input audio PES packet data to output the decoded audio data to an audio control unit 115 via a decoded audio data line 7. The audio control unit 115 is controlled via a control line 10-6 by the system controller 129, performs a D/A conversion process and the like in order to convert the decoded audio data into a format suitable for an external monitor, and outputs the audio data to an audio monitor 117 including an amplifier, a speaker and the like via a reproduction audio data line 9.

Next, the operation of recording received TS packet data so as to allow the data to be randomly accessed, will be described.

The TS packet data received by the tuner 101 is input to the SW circuit 103 and to a data control unit 121 via the TS input line 1. The data control unit 121 counts and stores a bit rate of the input TS packet data.

Figure 4:
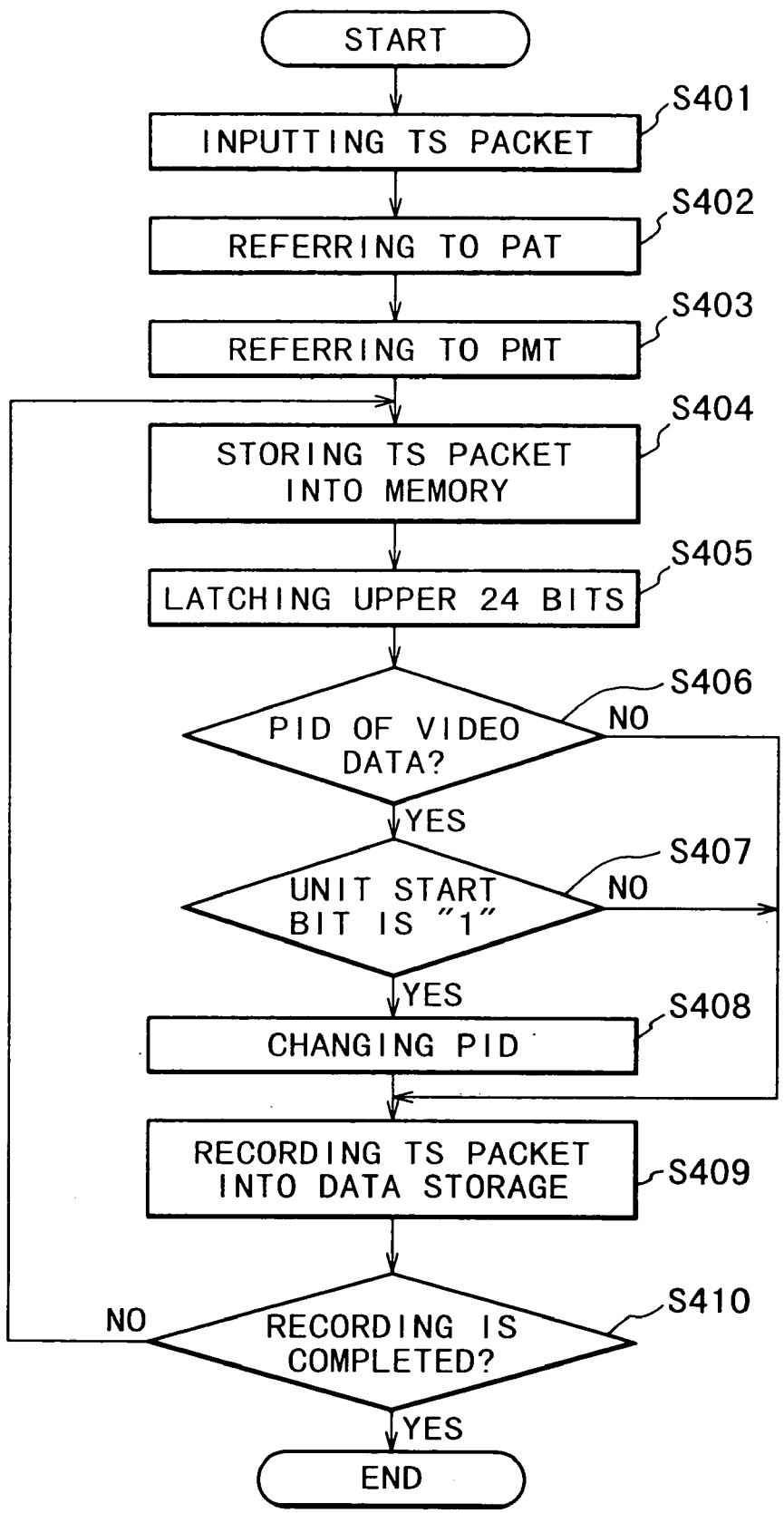
FIG. 4 is a flow chart illustrating the record operation of the apparatus shown in FIG. 1.

The control process to be executed by the data control unit 121 will be described with reference to the flow chart of FIG. 4.

Upon a record instruction from the operation unit 135, the system control unit 129 supplies a control signal to the data control unit 121. Upon reception of a record start instruction, the data control unit 121 receives the TS packet data from the tuner 101 at Step S401 (hereinafter Step is omitted), derives PAT from the input TS packet data (S402), and stores it in its inner register. Next, PMT is detected by referring to the stored PAT, and stored in the inner register, and by referring to the stored PMT information, PID of video and audio data of each program is discriminated (S403). Thereafter, the input TS packet data is temporarily latched in a memory 119 made of FIFO (S404).

Next, the data control unit 121 reads the top 24 bits of the TS packet stored in the memory 119 and latches them in its inner register (namely, 24 bits from the sync byte to PID shown in FIG. 2B are latched)(S405). The lower 13 bits (i.e., PID) of the latched 24 bits are detected which are then compared with PID of the video and audio packet data of each program described in PMT to thereby judge whether the TS packet data is the video TS packet data (S406). If not, it is recorded in a data storage 123 such as a hard disk and a magnetooptical disk (S409). It is then judged whether there is a record end instruction (S410). If not, the top 24 bits of the next TS packet are read and latched (S404).

If the TS packet latched in the memory 119 is the video TS packet, it is judged from the unit start indicator bit (one bit) at the upper tenth bit whether the TS packet contains the data at the start of the PES packet (S407). If the unit start indicator bit is "0", the TS packet data is stored in the data storage 123 (S409).

If it is judged at S407 that the unit start indicator bit is "1", PID of the TS packet is changed to reproduction time management information to be described later (S408) to thereafter record the TS packet data in the data storage 123 (S409). If the data latched in the memory 119 is PAT or PMT, it is recorded in the data storage 123.

As above, the TS packet data shown in FIG. 2A excepting PAT and PMT is recorded in the data storage 123, with PID of the TS packet data having the unit start indicator bit "1" being changed to the reproduction management information to be described later. PAT and PMT data is recorded in the data storage 123 in association with the recorded TS packet data. For reproduction, TS packet data read from the data storage 123 is multiplexed at predetermined timings and output.

The reproduction time management information is selectively assigned a value in conformity with the following five rules.

(1) A value different from PID=0X0000 assigned to PAT.

(2) A value satisfying the condition (1) and being different from PID=0X0001 assigned to CAT as defined in ISO/IEC 13818-1.

(3) A value satisfying the conditions (1) and (2) and being different from PID from 0X0002 to 0X000F reserved as defined in ISO/IEC 13818-1.

(4) A value satisfying the conditions (1) to (3) and being different from PID=0X1FFF assigned to a "null packet" as defined in ISO/IEC 13818-1.

(5) A value satisfying the conditions (1) to (4) and being different from PID contained in TS data input from the TS input line 1 shown in FIG. 1 (e.g., a value different from PID from 0X0011 to 0X0019 illustratively shown in FIG. 3).

The changed PID and reproduction time management information are input to a TSAT (Transport Stream Accession Table) composition unit 133 via a TSAT information line 35, as directory information used for random access reproduction. The TSAT composition unit 133 composes a table (hereinafter called a TSAT) storing the relation between the original PID and changed reproduction time management information and stores TSAT in its inner memory.

An example of TSAT is shown in FIG. 5. TSAT stores: table index information; original PID information of each TS packet at the time when the TS packet is input to the data control unit 121; reproduction time management information replaced by the data control unit 121; management information of the data storage 123 (address information of each TS packet if a semiconductor memory or the like is used, cluster information of each TS packet if a hard disk or the like is used); and management information of a data storage to be described later (address information of sample image data generated by a GUI composition unit 137 to be described later if a semiconductor memory or the like is used, cluster information of sample image data if a hard disk or the like is used).

The index information is made of, for example, 32 bits. The number of bits is not limited thereto, because it often depends on the system structure, the structure of the data storage and the like, and the random access interval.

In accordance with the flow chart described above, the received TS packet data is sequentially recorded in the data storage 123.

Next, the description will be given for GUI which supports random access reproduction for the TS packet data recorded in the data storage 123.

The data control unit 121 records the received TS packet data in the data storage 123 as described above and also outputs it to a demultiplexer 125 via a data line 14.

The demultiplexer 125 detects video data of the video TS packets of the program numbers 1 to 3, in accordance with PAT and PMT in the TS packet data input from the data control unit 121, and composes a video PES packet and outputs it to a video decoding unit 127 via a data line 15.

Upon reception of the video PES packet data of the three programs, the vide decoding unit 127 starts decoding video data. In this embodiment, only the first video frame (corresponding to I frame of MPEG) of each PES packet data is decoded. Therefore, if twenty sets of PES packet data are generated from the TS packet data having the same PID and recorded in a predetermined period, twenty video frames are decoded. Video data of each decoded frame is used as a sample image used for random access reproduction.

The vide decoding unit 127 adds reproduction time management information supplied from the TSAT composition unit 133 via a TSAT information line 36, to the data of each decoded video frame (one frame per one PES packet), and outputs the result to the GUI composition unit 131 via a data line 16.

The GUI composition unit 131 records the video data and reproduction time management information of the first video frame of each PES packet supplied from the video decoding unit 127, in the data storage 137. The GUI composition unit 131 receives, from the data control unit 121, channel information of each video data input from the video decoding unit 127, and records it in association with each video data in a data storage 137.

By using the video data, reproduction management information and channel information recorded in the data storage 137, GUI images are generated for random access reproduction (search) of the TS packet data recorded in the data storage 123, as will be described later, and output via a data line 17 to the video control unit 109 to be displayed on the video display unit 111.

Figure 6:
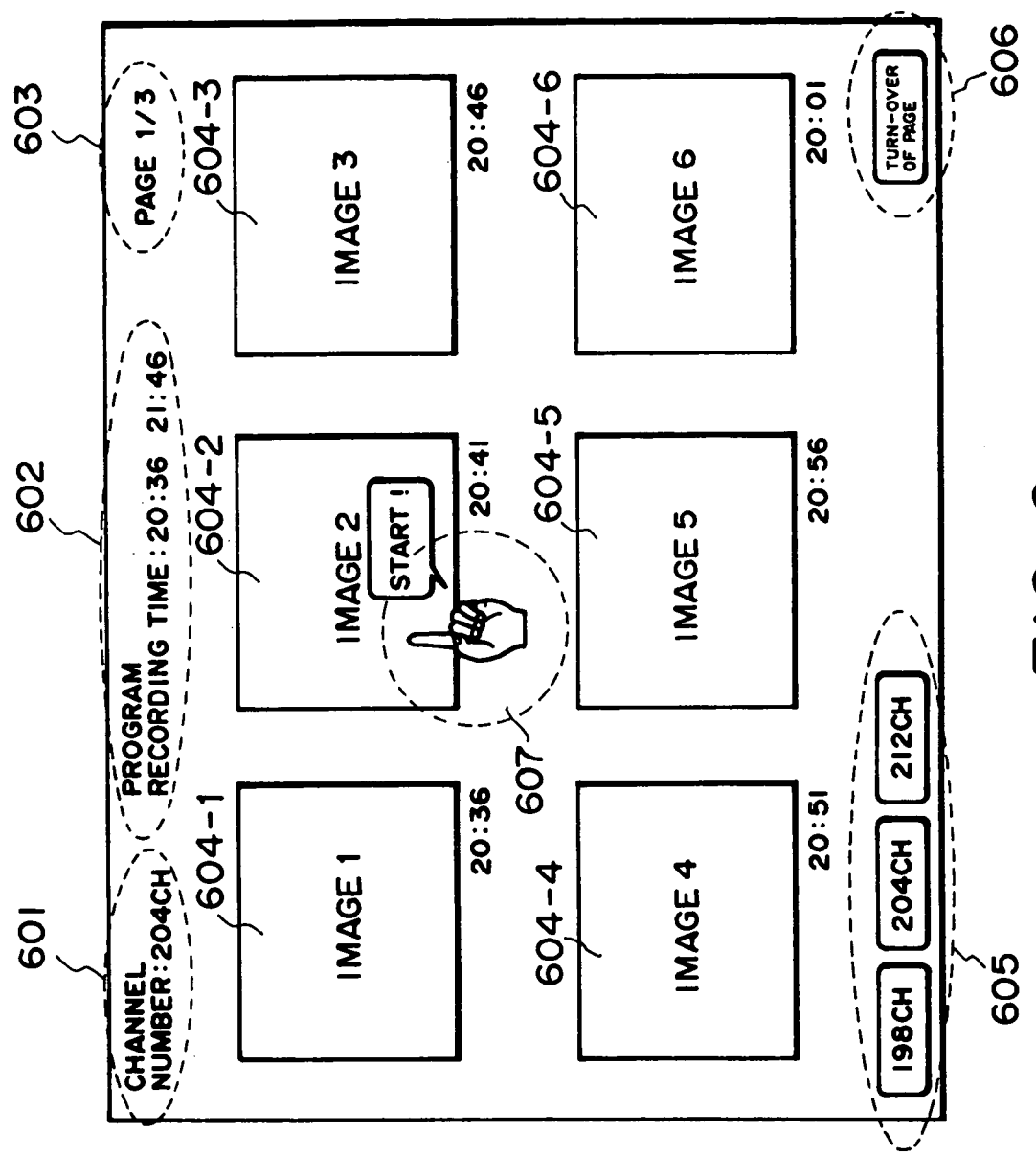
FIG. 6 is a diagram showing GUI images according to a first embodiment of the invention.

Examples of GUI images generated by the GUI composition unit 131 and displayed on the display unit 111 are shown in FIG. 6.

In FIG. 6, reference numeral 601 represents a television channel number selected by the operation unit 135, reference numeral 602 represents a program recording time, and reference numeral 603 represents a page number of GUI images.

Reference numerals 604-1 to 604-6 represent sample images 1 to 6 of reduced video frame images decoded by the video decoding unit 127 and recorded in the data storage 137. Reference numeral 605 represents selection buttons for the recorded channel numbers. In this embodiment, since the TS data of three multiplexed channels (programs) are recorded, three channels are displayed. Reference numeral 606 represents a page turn-over button for turning over a display page of GUI images. Reference numeral 607 represents an icon for selecting a candidate image during a GUI operation. A user operates upon the operation unit 135 including a mouse, a keyboard, various switches for recording, reproducing and other operations, to thereby instruct random reproduction to be described later.

Figure 7:
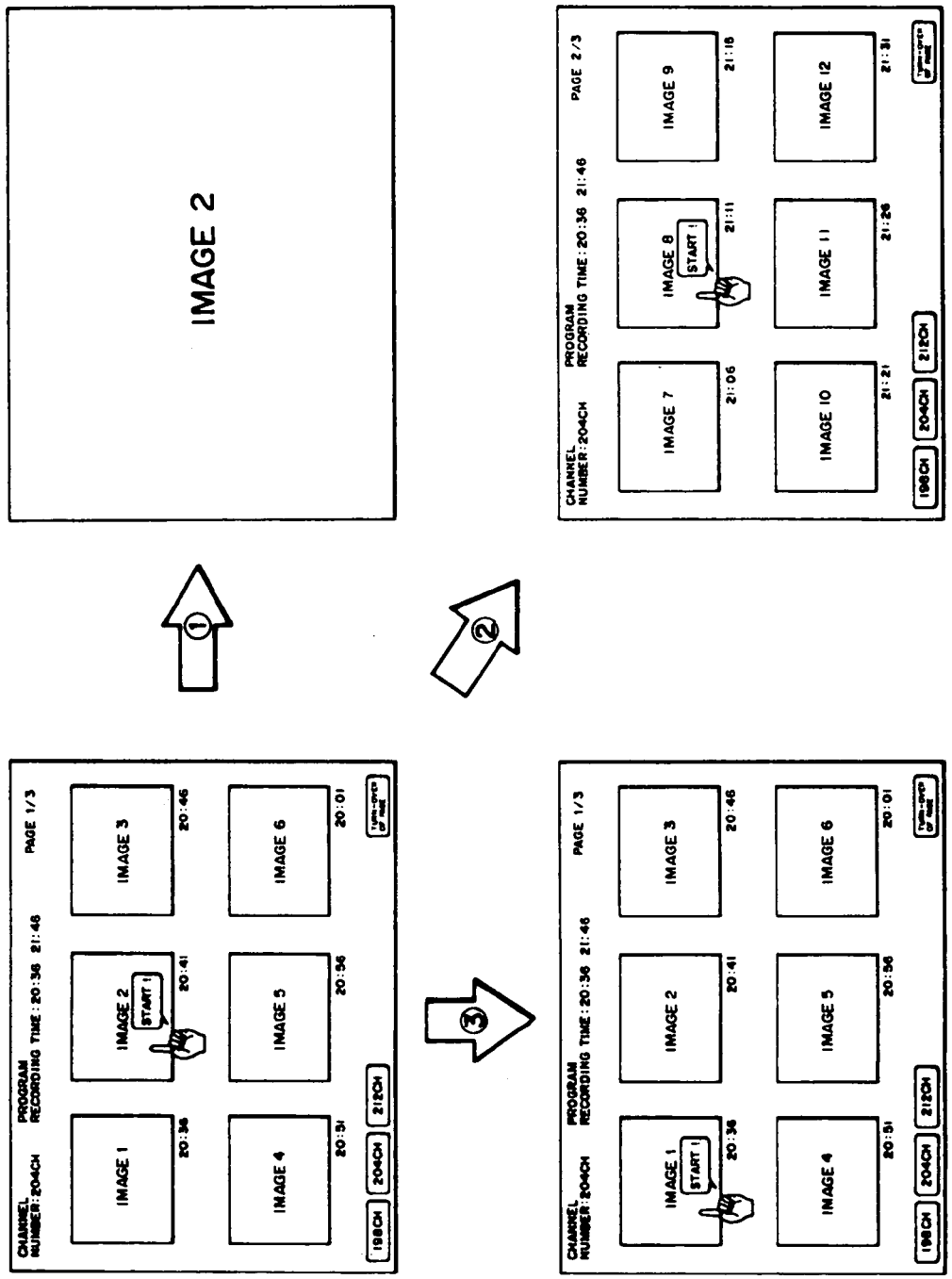
FIG. 7 is a diagram illustrating switching between GUI images according to the first embodiment.

An example of switching between GUI images when a GUI selection operation is effected by the icon 607 is shown in FIG. 7.

Referring to FIG. 7, an arrow (1) shows a selection of an image 2 (604-2) by the icon 607 shown in FIG. 6. In this operation shown by the arrow (1), original image data of the reduced GUI image 2 is read from the data storage 137 shown in FIG. 1 and displayed on the display unit 111, or program reproduction of the TS packet data recorded in the data storage 123 starts from an area corresponding to the image 2, i.e., the random access reproduction starts. The operation of the random access reproduction will be later described.

In FIG. 7, the operation shown by an arrow (2) illustrates a switch to the GUI images at page 2/3 of the same channel number (e.g., 204 ch) by designating the page turn-over switch 606 with the icon 607. The operation shown by an arrow (3) illustrates a switch to GUI images, for example, at 198 ch by designating the channel number selection button 605 with the icon 607. With the operation shown by the arrow (3), each sample image displayed is the image at 198 ch.

Next, the operation of a random access by using GUI images will be described.

When an instruction of random access reproduction is issued from the operation unit 135, the system control unit 129 controls the GUI composition unit 131 to generate GUI images, such as shown in FIG. 6 and display them on the display unit 111.

The random access reproduction of, for example, the image 2 shown in FIG. 6 is performed in the following manner. In response to an instruction from the operation unit 135, the system control unit 129 instructs the GUI composition unit 131 to send the reproduction time management information of the designated image 2. The GUI composition unit 131 reads the reproduction time management information recorded in the data storage 137 together with the video data of the image 2, and outputs it to the system control unit 129. In accordance with the supplied reproduction management information (herein assumed to be 0X0024), the system control unit 129 acquires the index information (0X00000004 shown in FIG. 5) of TSAT by referring to TSAT stored in the inner memory of the TSAT composition unit 133 via the TSAT information line 37.

In accordance with the acquired index information, PID originally affixed to the TS packet containing the data of the selected image 2 and the management information of the data storage 123 shown in FIG. 1 is obtained. In accordance with this management information, the TS packet data recorded in the data storage 123 is reproduced and temporarily stored in the memory 119.

The data control unit 121 refers to TSAT, and if PID of the TS packet stored in the memory 119 was changed to the reproduction management information when the TS packet was recorded, the data control unit 121 changes the reproduction time management information to the original PID. PAT and PMT reproduced from the data storage 123 and stored in the inner register are added to the reproduced TS packet to reconfigure the TS packet data time divisionally multiplexed, as shown in FIG. 2A. The TS packet data is then input to the SW circuit 103 via the data line 11, shown in FIG. 1, at the bit rate corresponding to the recording bit rate stored in the data control unit 121. When the data control unit 121 reproduces TS packet data from the data storage 123, PAT and PMT are always added in this order to the start of the TS packet data train and output to the SW circuit 103, irrespective of whether the reproduction is normal reproduction or random reproduction. Thereafter, PAT and PMT are inserted by predetermined timings.

For the reproduction, the SW circuit 103 selects the reproduced TS packet data from the signal line 11 and outputs it to the demultiplexer 105. Thereafter, the processes similar to those during reception are performed to display the reproduced image on the display unit 111 and output reproduced sounds from the audio monitor 117.

If the normal reproduction is to be performed instead of the random access reproduction, the system control unit 129 refers to TSAT to detect the storage location of the start TS packet of the designated program in the data storage 123, and controls the data control unit 121 to start the reproduction of the TS packet data from the storage location. The processes to follow are similar to those of the random access reproduction.

In this embodiment, when the TS packet data is recorded in the data storage, PID (Program ID) of the video TS packet data having the payload_unit_start_indicator "1", i.e., of the TS packet containing the start portion of each PES packet, is changed to the reproduction time management information having the same number of bits, and the storage location of the changed PID is stored in TSAT. Therefore, the random access reproduction from the start portion of each PES packet can be executed on the PES packet basis.

Furthermore, since GUI images are displayed to support the random access reproduction by using the frame image in the start portion of each PES packet, the reproduction (random access reproduction) from a position desired by a user can be easily realized.

In this embodiment, a TS packet containing the start portion of the PES packet is detected and PID of this TS packet is changed to the reproduction management information shown in FIG. 5. Instead, PID of the received TS packet data may not be changed and may be directly recorded in the data storage. In this case, TSAT is formed by adding an index to the storage location of the TS packet containing the start portion of PES, and this index is used as the directory for the random access reproduction.

The recording operation of the data control unit 121 to realize this will be described with reference to the flow chart of FIG. 8.

Figure 8:
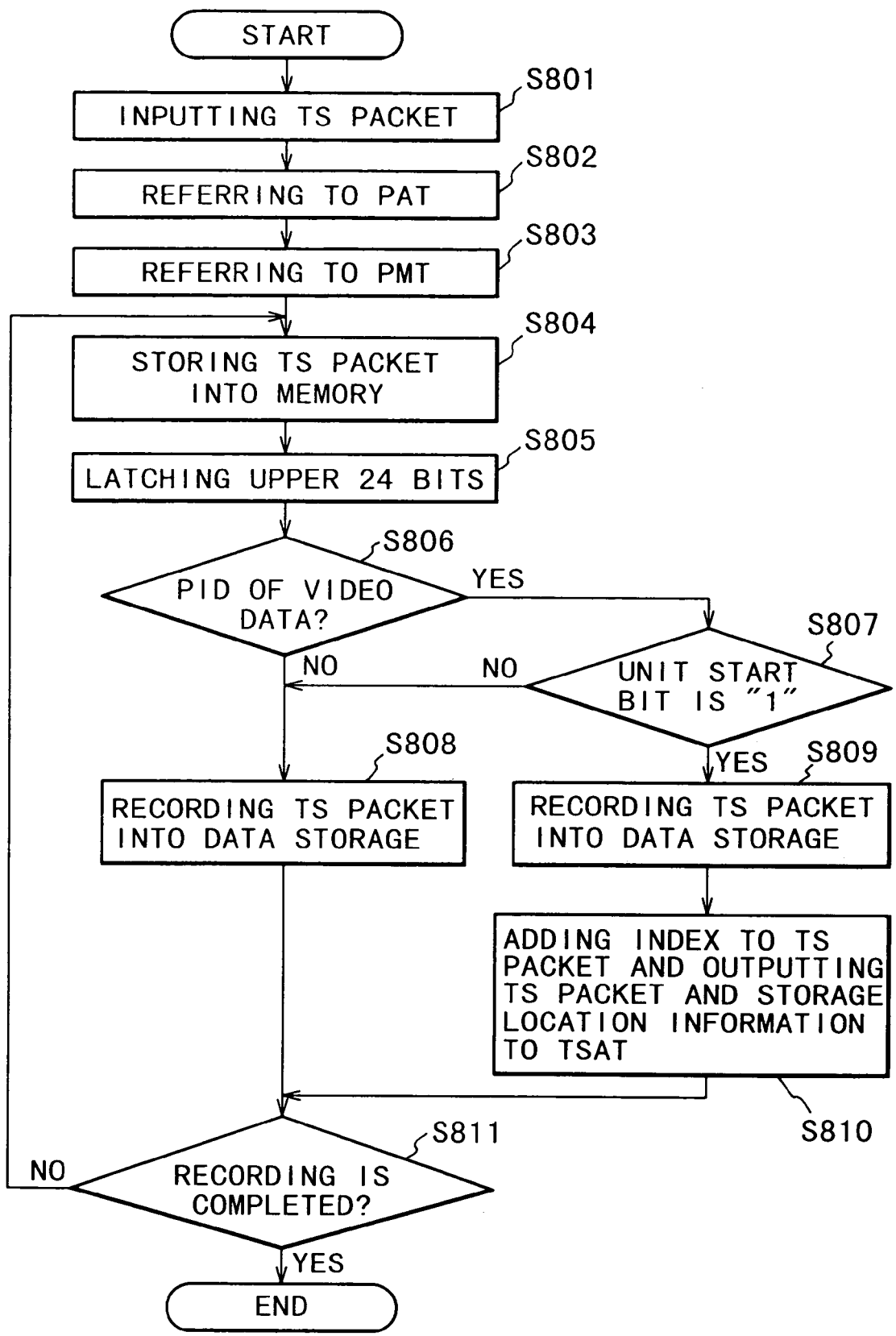
FIG. 8 is a flow chart illustrating the record operation of the apparatus shown in FIG. 1 according to a second embodiment of the invention.

FIG. 8 is a flow chart illustrating the recording operation of the data control unit 121 according to the second embodiment.

Referring to FIG. 8, upon a record instruction from the operation unit 135, the system control unit 129 supplies a control signal to the data control unit 121. Upon reception of a record start instruction, the data control unit 121 receives the TS packet data from the tuner 101 at S801, derives PAT from the input TS packet data (S802), and stores it in its inner register. Next, PMT is detected by referring to the stored PAT, and stored in the inner register, and by referring to the stored PMT information, PID of video and audio data of each program is discriminated (S803). Thereafter, the input TS packet data is temporarily latched in the memory 119 made of FIFO (S804).

Next, the data control unit 121 reads the top 24 bits of the TS packet stored in the memory 119 and latches them in its inner register. The lower 13 bits of the latched 24 bits are detected which are then compared with PID of the video and audio packet data of each program described in PMT to thereby judge whether the TS packet data is the video TS packet data (S806). If not, it is recorded in the data storage 123 such as a hard disk and a magnetooptical disk (S808). It is then judged whether there is a record end instruction (S811). If not, the top 24 bits of the next TS packet are read and latched (S804).

If the TS packet latched in the memory 119 is the video TS packet, it is judged from the unit start indicator bit at the upper tenth bit whether the TS packet contains the data at the start of the PES packet (S807). If the unit start indicator bit is "0", the TS packet data is stored in the data storage 123 (S808).

If it is judged at S807 that the unit start indicator bit is "1", the TS packet is recorded in the data storage 123 (S809), an index is affixed to this TS packet, and the storage location information of the TS packet is output to the TSAT composition unit 133 (S810). Similar processes are repeated so that the storage locations, in the data storage 123, of the video TS packets containing the start portion of PES are output to the TSAT composition unit 133 together with the index numbers.

In the second embodiment, the TSAT composition unit 133 generates TSAT, such as shown in FIG. 9, and stores it in the inner memory. TSAT shown in FIG. 9 stores in its inner memory the storage location, in the data storage 123, of the TS packet containing the start portion of PES as well as the index data in association with the storage location. TSAT also stores the associated storage location of the sample image data recorded in the data storage 137 by the GUI composition unit 131.

The data control unit 121 outputs the received TS packet data to the demultiplexer 125. The demultiplexer 125 detects the video TS packet from the input TS packet data, generates the video PES packet data for each program, and outputs it to the video decoding unit 127.

The video decoding unit 127 decodes video data of only one frame in the start portion of each PES among the input video PES data. The video decoding unit 127 reads from the TSAT composition unit 133 the index number data corresponding to the image data of each decoded frame, i.e., index number data affixed to the TS packet containing the video data of the decoded frame, and adds the index number data to the decoded video data to output the result to the GUI composition unit 131.

The GUI composition unit 131 records in the data storage 137 the decoded video data and index number data output from the video decoding unit 127 as well as the channel information of each video data received from the data control unit 121, each data being associated with each other. By using the recorded decoded video data and index number data and channel information, the GUI composition unit 131 generates GUI images as shown in FIG. 6 and outputs them to the video control unit 109.

Next, the operation of random access reproduction by using GUI images according to the second embodiment will be described.

When an instruction of random access reproduction is issued from the operation unit 135, the system control unit 129 controls the GUI composition unit 131 to generate GUI images, such as shown in FIG. 6, and display them on the display unit 111.

The random access reproduction of, for example, the image 2 shown in FIG. 6 is performed in the following manner. In response to an instruction from the operation unit 135, the system control unit 129 shown in FIG. 1 instructs the GUI composition unit 131 to send the index number data of the designated image 2. The GUI composition unit 131 reads the index number data recorded in the data storage 137 together with the video data of the image 2, and outputs it to the system control unit 129.

In accordance with the supplied index number data, the system control unit 129 acquires the data storage management information of the TS packet containing the data of the selected image 2, by referring to TSAT stored in the inner memory of the TSAT composition unit 133 via the TSAT information line 37. In accordance with the acquired data storage management information, the TS packet data is reproduced from the data storage 123 and temporarily stored in the memory 119.

The data control unit 121 adds PAT and PMT reproduced from the data storage 123 and stored in the inner register to the reproduced TS packet to reconfigure the TS packet data time divisionally multiplexed, as shown in FIG. 2A. The TS packet data is then input to the SW circuit 103 via the data line 11, shown in FIG. 1, at the bit rate corresponding to the recording bit rate stored in the data control unit 121. When the data control unit 121 reproduces TS packet data from the data storage 123, PAT and PMT are always added in this order to the start of the TS packet data train and output to the SW circuit 103, irrespective of whether the reproduction is normal reproduction or random reproduction. Thereafter, PAT and PMT are inserted by predetermined timings.

For the reproduction, the SW circuit 103 selects the reproduced TS packet data from the signal line 11 and outputs it to the demultiplexer 105. Thereafter, the processes similar to those during reception are performed to display the reproduced image on the display unit 111 and output reproduced sounds from the audio monitor 117.

If the normal reproduction is to be performed instead of the random access reproduction, the system control unit 129 refers to TSAT to detect the storage location of the start TS packet of the designated program in the data storage 123, and controls the data control unit 121 to start the reproduction of the TS packet data from the storage location. The processes to follow are similar to those of the random access reproduction.

In this embodiment, when the TS packet data is recorded in the data storage, an index number is affixed to the video TS packet data having the unit start indicator bit "1". A directory is formed by using the storage location of the TS packet and stored in TSAT. Therefore, the random access reproduction from the start portion of each PES packet can be executed in the PES packet unit.

Furthermore, since GUI images are displayed to support the random access reproduction by using the frame image in the start portion of each PES packet, the reproduction from a position desired by a user can be easily realized.

Next, the third embodiment of the invention will be described.

Also in the third embodiment, the structure and operation of the recording and reproducing apparatus are similar to those described in FIG. 1. In the third embodiment, GUI images used for random access reproduction are different from those of the first and second embodiments. GUI images of the third embodiment are shown in FIG. 10.

Figure 10:
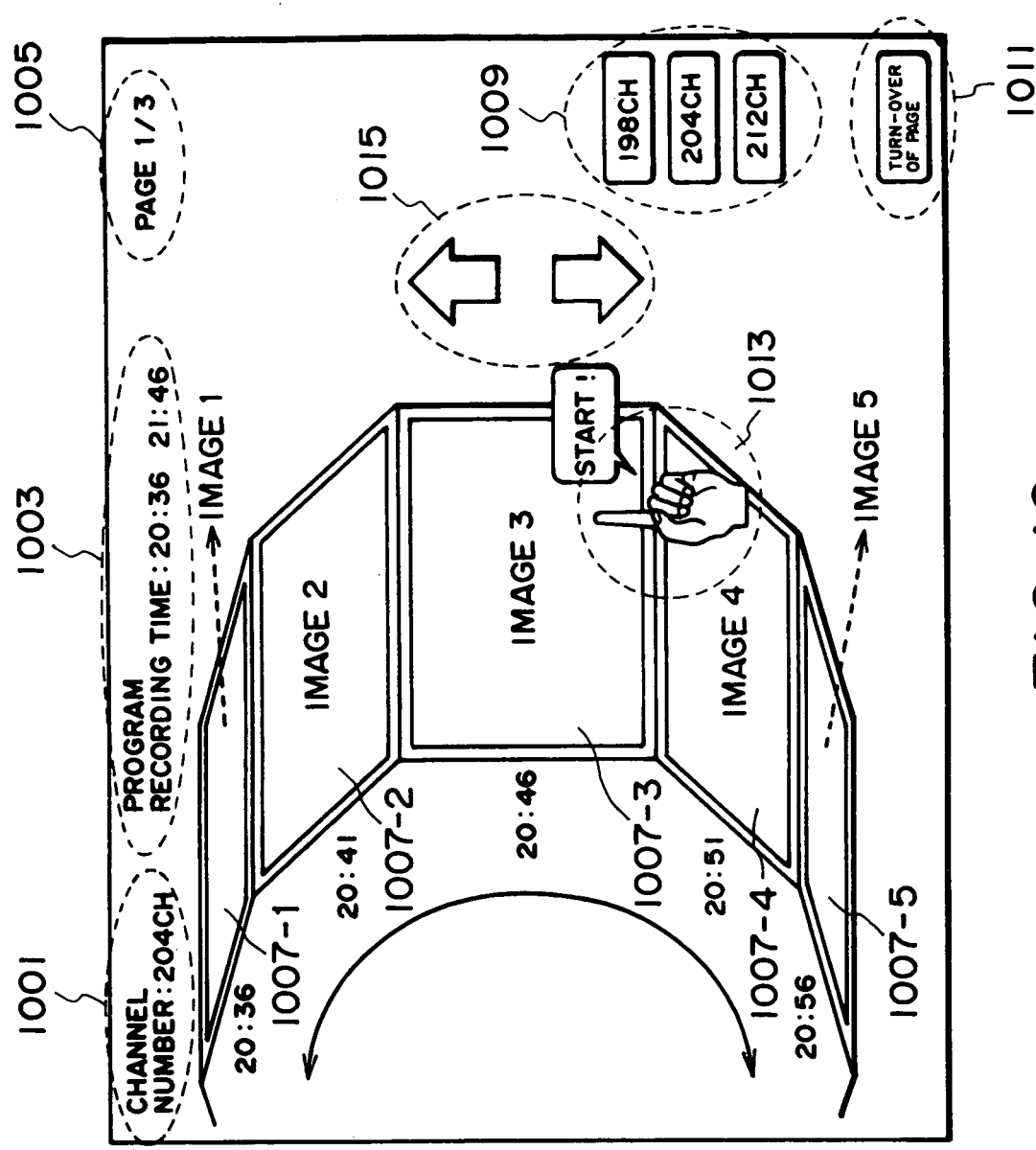
FIG. 10 is a diagram showing GUI images according to a third embodiment of the invention.

In FIG. 10, reference numeral 1001 represents a selected television channel number, reference numeral 1003 represents a program recording time, and reference numeral 1005 represents a page number of GUI images.

Reference numerals 1007-1 to 1007-5 represent sample images 1 to 5 of reduced video frame images decoded by the video decoding unit 127. Reference numeral 1009 represents selection buttons for the recorded channel numbers. Reference numeral 1011 represents a page turn-over button for turning over a display page of GUI images. Reference numeral 1013 represents an icon for selecting a candidate image during a GUI operation. Reference numeral 1015 represents a switching button for selecting an image to be displayed at the start of random access reproduction.

Figure 11:
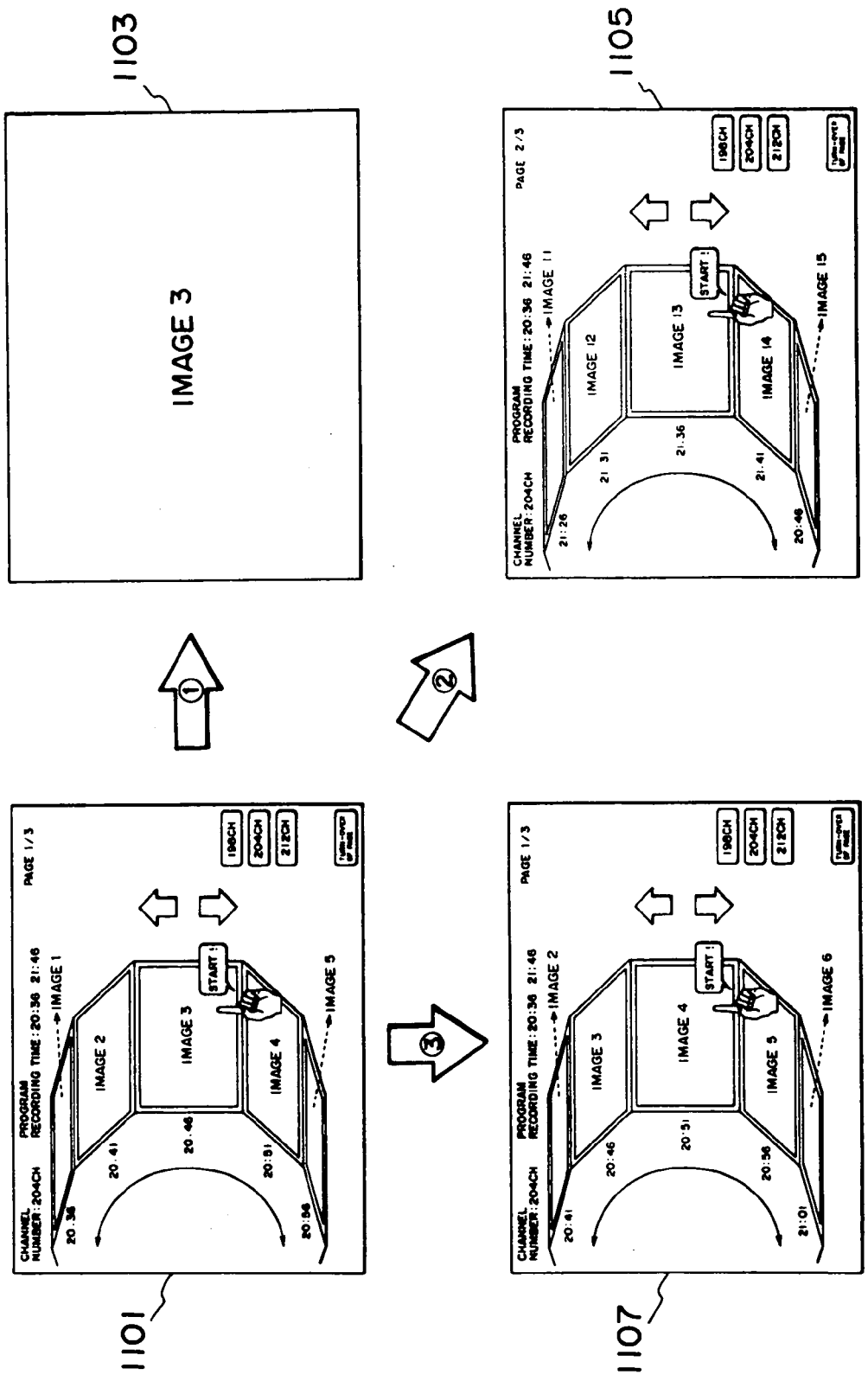
FIG. 11 is a diagram illustrating switching between GUI images according to the third embodiment.

An example of switching between GUI images when a GUI selection operation is effected by the icon 1013 is shown in FIG. 11.

Referring to FIG. 11, an arrow (1) shows a selection of an image 3 by the icon 1013. In this operation shown by the arrow (1), original image data of the reduced GUI image 3 is read from the data storage 137 shown in FIG. 1 and displayed, or program reproduction of the TS packet data recorded in the data storage 123 starts from an area corresponding to the image 3 in the TS packet data, i.e., the random access reproduction starts, to thereby display the image on the display unit 111 as indicated by 1103.

The operation shown by an arrow (2) illustrates a switch to a GUI image 13 which is selected as the candidate image at the start of the random access by designating the page turn-over switch 1011 with the icon 1013 as indicated by 1105. The operation shown by an arrow (3) illustrates a switch to GUI images at 198 ch by designating the channel number selection button 1009 with the icon 1013, as indicated by 1107.

Next, the fourth embodiment of the invention will be described.

Also in the fourth embodiment, the structure and operation of the recording and reproducing apparatus are similar to those described in FIG. 1. In the fourth embodiment, GUI images used for random access reproduction are different from those of the first to third embodiments. GUI images of the fourth embodiment are shown in FIG. 12.

Figure 12:
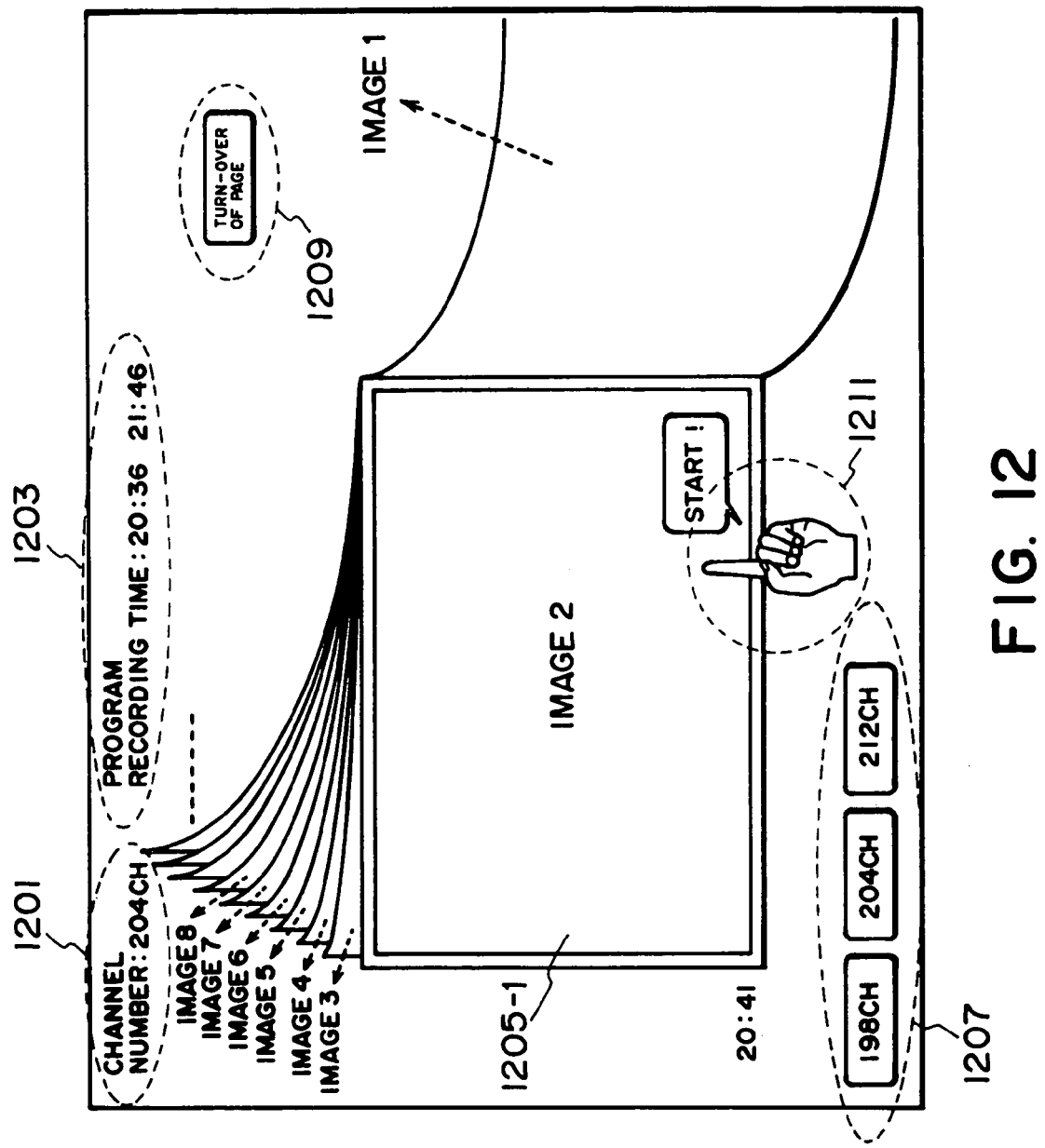
FIG. 12 is a diagram showing GUI images according to a fourth embodiment of the invention.

In FIG. 12, reference numeral 1201 represents a selected television channel number, and reference numeral 1203 represents a program recording time.

Reference numeral 1205-1 represents a sample image 2 of a reduced video frame image decoded by the video decoding unit 127. Reference numeral 1207 represents selection buttons for the recorded channel numbers. Reference numeral 1209 represents a page turn-over button for turning over a display page of GUI images to select the sample image for the start of random access reproduction. Reference numeral 1211 represents an icon for selecting a candidate image during a GUI operation.

Figure 13:
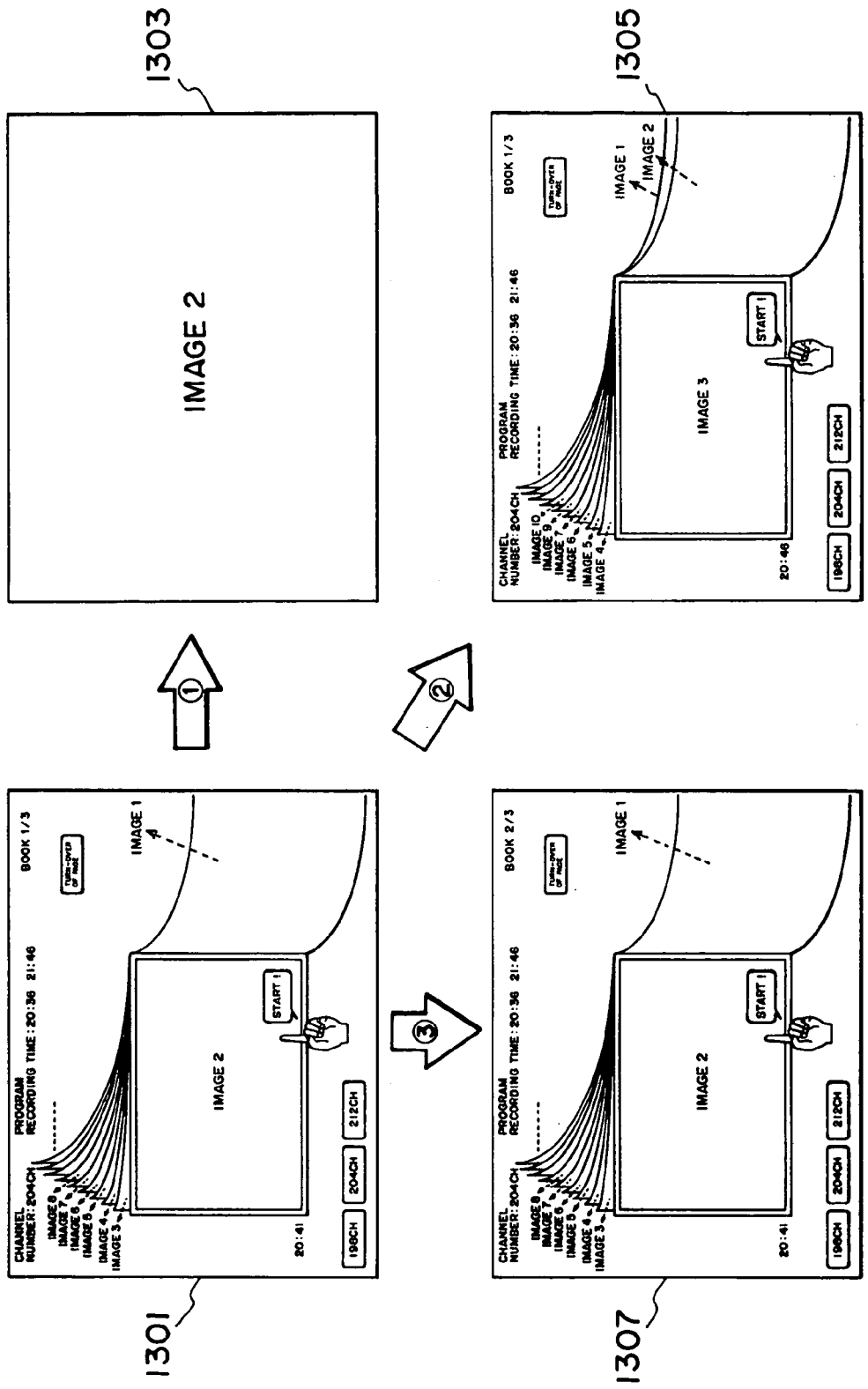
FIG. 13 is a diagram illustrating switching between GUI images according to the fourth embodiment.

An example of switching between GUI images when a GUI selection operation is effected by the icon 1211 is shown in FIG. 13.

Referring to FIG. 13, an arrow (1) shows a selection of an image 2 by the icon 1211. In this operation shown by the arrow (1), original image data of the reduced GUI image 2 is read from the data storage 137 shown in FIG. 1 and displayed, or program reproduction of the TS packet data recorded in the data storage 123 starts from an area corresponding to the image 2 in the TS packet data, i.e., the random access reproduction starts, to thereby display the image on the display unit 111 as indicated by 1303.

The operation shown by an arrow (2) illustrates a switch to a GUI image 3 which is selected as the candidate image at the start of the random access by designating the page turn-over switch 1209 with the icon 1211 as indicated by 1305. The operation shown by an arrow (3) illustrates a switch to a GUI image at 198 ch for example by designating the channel number selection button 1207 with the icon 1211, as indicated by 1307.

Next, the fifth embodiment of the invention will be described.

In the first and second embodiments, all TS packets containing the start portion of each video PES packet are detected from the received TS packet data, and an index is added to the storage location of the detected TS packet to form a directory which is stored in TSAT. The index number may be affixed to the TS packet each time n (n is an integer of 2 or larger) TS packets containing the start portion of the PES packet are detected. The storage location of this TS packet affixed with the index number is stored in TSAT. In this manner, the time interval of random access can be changed.

The operation of TS packet recording and TSAT generation by the data control unit 129 according to the fifth embodiment will be described with reference to the flow chart shown in FIG. 14.

Figure 14:
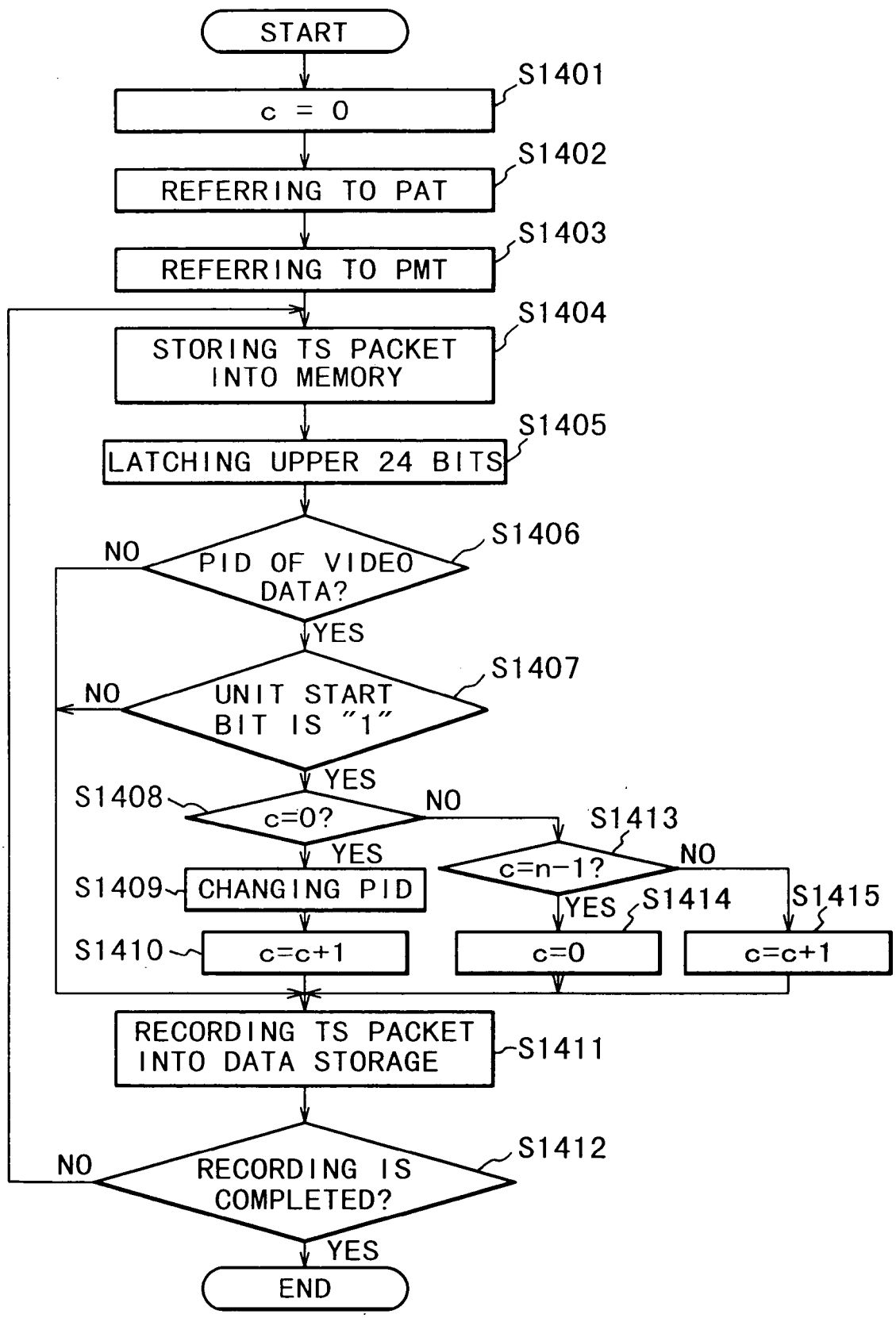
FIG. 14 is a flow chart illustrating the record operation according to a fifth embodiment of the invention.

In this embodiment, the recording operation by the data control unit 127 is changed as illustrated in FIG. 14 to change the time interval of random access start candidate images. More specifically, in the first and second embodiments, the time interval of random access start candidate images is set to 5 minutes, as illustrated in FIG. 6, it can be changed to 10 minutes according to the flow chart shown in FIG. 14.

Upon a record instruction from the operation unit 135, the system control unit 129 supplies a control signal to the data control unit 121. Upon reception of a record start instruction, the data control unit 121 first resets a variable c to 0 (S1401), the variable being used for counting the number of detections of the TS packet having the unit start indicator bit "1", and receives at S1402 the TS packet data from the tuner 101. In this embodiment, since the TS packet data multiplexing three programs shown in FIG. 2A is recorded, three variables c1, c2 and c3 corresponding to three programs are prepared. Since the processes for the TS packet data of each program are the same, processes for one program only will be described in the following.

After the TS packet is received at S1401, the data control unit 121 detects PAT from the input TS packet data (S1402), and stores it in its inner register. Next, PMT is detected by referring to the stored PAT, and stored in the inner register, and by referring to the stored PMT information, PID of video and audio data of each program is discriminated (S1403). Thereafter, the input TS packet data is temporarily latched in a memory 119 made of FIFO (S1404).

Next, the data control unit 121 reads the top 24 bits of the TS packet stored in the memory 119 and latches them in its inner register (S1405). The lower 13 bits of the latched 24 bits are detected which are then compared with PID of the video and audio packet data of each program described in PMT to thereby judge whether the TS packet data is the video TS packet data (S1406). If not, it is recorded in a data storage 123 such as a hard disk and a magnetooptical disk (S1411). It is then judged whether there is a record end instruction (S1412). If not, the top 24 bits of the next TS packet are read and latched (S1404).

If the TS packet latched in the memory 119 is the video TS packet, it is judged from the unit start indicator bit at the upper tenth bit whether the TS packet contains the data at the start of the PES packet (S1407). If the unit start indicator bit is "0", the TS packet data is stored in the data storage 123 (S1411).

If it is judged at S1407 that the unit start indicator bit is "1", it is judged whether the variable c is 0 (S1408). If the variable c is 0, PID of the TS packet is changed to the reproduction time management information (S1410) to increment the variable c by 1 and thereafter record the TS packet data in the data storage 123 (S1411). If the variable c is not 0 at S1408, it is judged that although the TS packet contains the data at the start of PES, the TS packet data is not a random access start candidate and the PID of the TS packet is not changed.

If the variable c is not 0 at S1408 and if the variable c is n-1 (S1413), the variable c is reset to 0 and the TS packet is recorded in the data storage 123 (S1411). If the variable c is not n-1, the variable c is incremented by 1, and the TS packet is recorded in the data storage 123 (S1415).

In this embodiment, the data control unit 121 operates in accordance with the flow chart of FIG. 14 at n=2. Each time the TS packet having the unit start indicator bit "1" is detected twice, PID of the detected TS packet data is changed and stored in the data storage 123 shown in FIG. 1. In this manner, the time interval of 5 minutes for random access start candidate images in the first and second embodiments can be doubled and set to 10 minutes.

The random access reproduction and ordinary reproduction of TS packet data of the fifth embodiment are similar to those of the first to fourth embodiments excepting that the time interval of random access start images is prolonged.

In this embodiment, the data control unit 121 operates in accordance with the flow chart of FIG. 14 at n=2, and each time the TS packet having the unit start indicator bit "1" is detected twice, PID is changed. Instead, n may be set to 3 or 4 to change the time when PID is changed to the reproduction time management information. The time interval of random access start candidate images can therefore be set to a threefold of 15 minutes and a fourfold of 20 minutes as desired.

Also in this embodiment, although the data control unit 121 stores in advance the value n. Instead, a user may set the value n from the operation unit 135.

In this embodiment, when the TS packet data is recorded in the data storage, each time the TS packet having the payload_unit_start_indicator "1", i.e., the TS packet containing the start portion of each PES packet is detected n times, PID (Program ID) of 13 bits of the TS packet is changed to the reproduction time management information having the same number of bits, and the storage location of the changed PID is stored in TSAT. Therefore, the random access reproduction from the start portion of each PES packet can be executed in the unit of n PES packets.

Furthermore, since GUI images are displayed to support the random access reproduction by using the frame image in the start portion of each PES packet, the reproduction (random access reproduction) from a position desired by a user can be easily realized.

In this embodiment, a TS packet containing the start portion of the PES packet is detected and PID of this TS packet is changed to the reproduction time management information shown in FIG. 5. Instead, similar to the second embodiment, PID of the received TS packet data may not be changed and may be directly recorded in the data storage. In this case, TSAT is formed by adding an index to the storage location of the TS packet containing the start portion of PES, and this index is used as the directory for the random access reproduction. The recording operation of the data control unit 121 to realize this will be described with reference to the flow chart of FIGS. 15A and 15B.

Figure 15B:
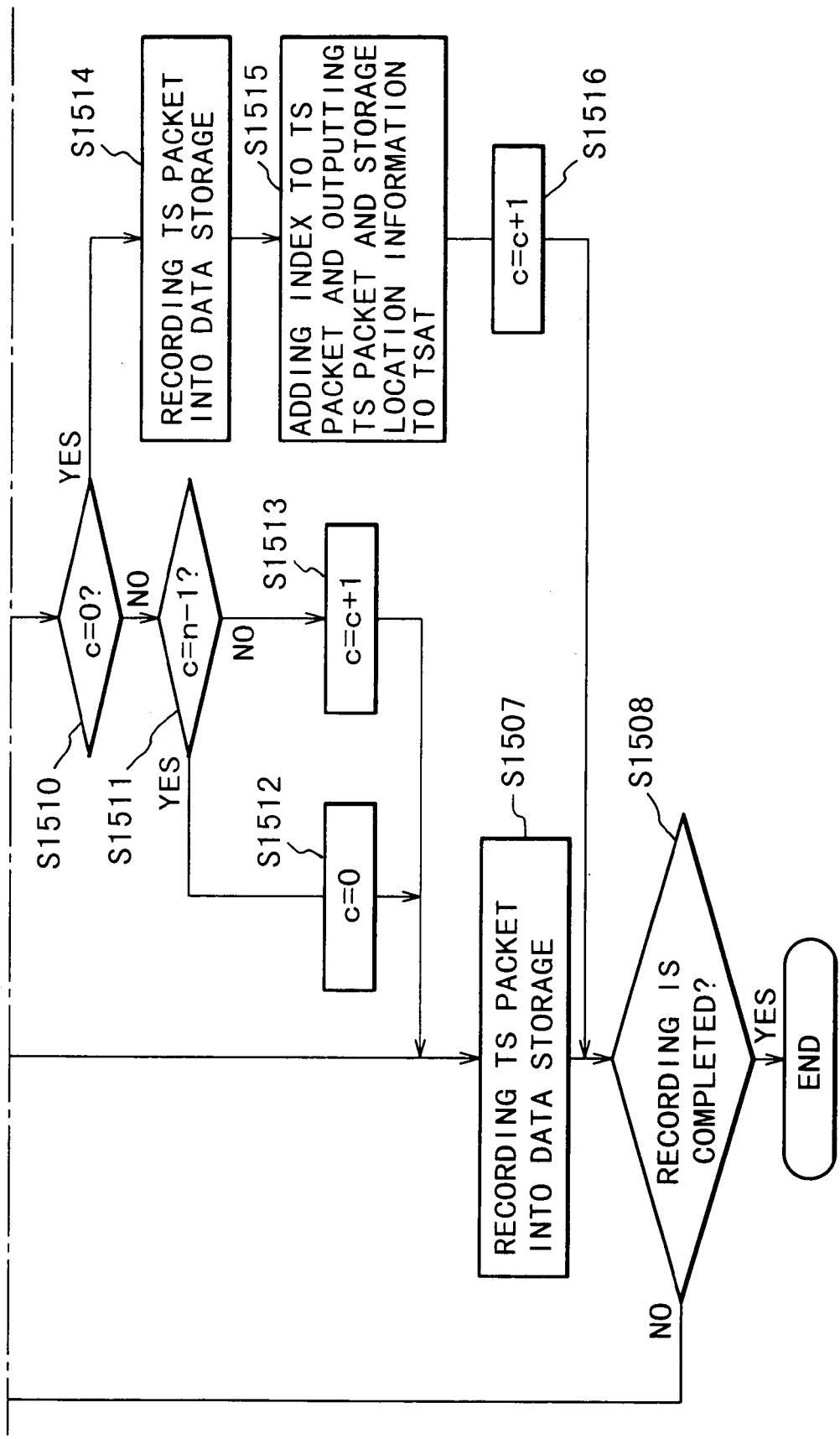
FIG. 15 which is composed of FIGS. 15A and 15B is a flow chart illustrating the record operation according to an embodiment of the invention.
Figure 16:
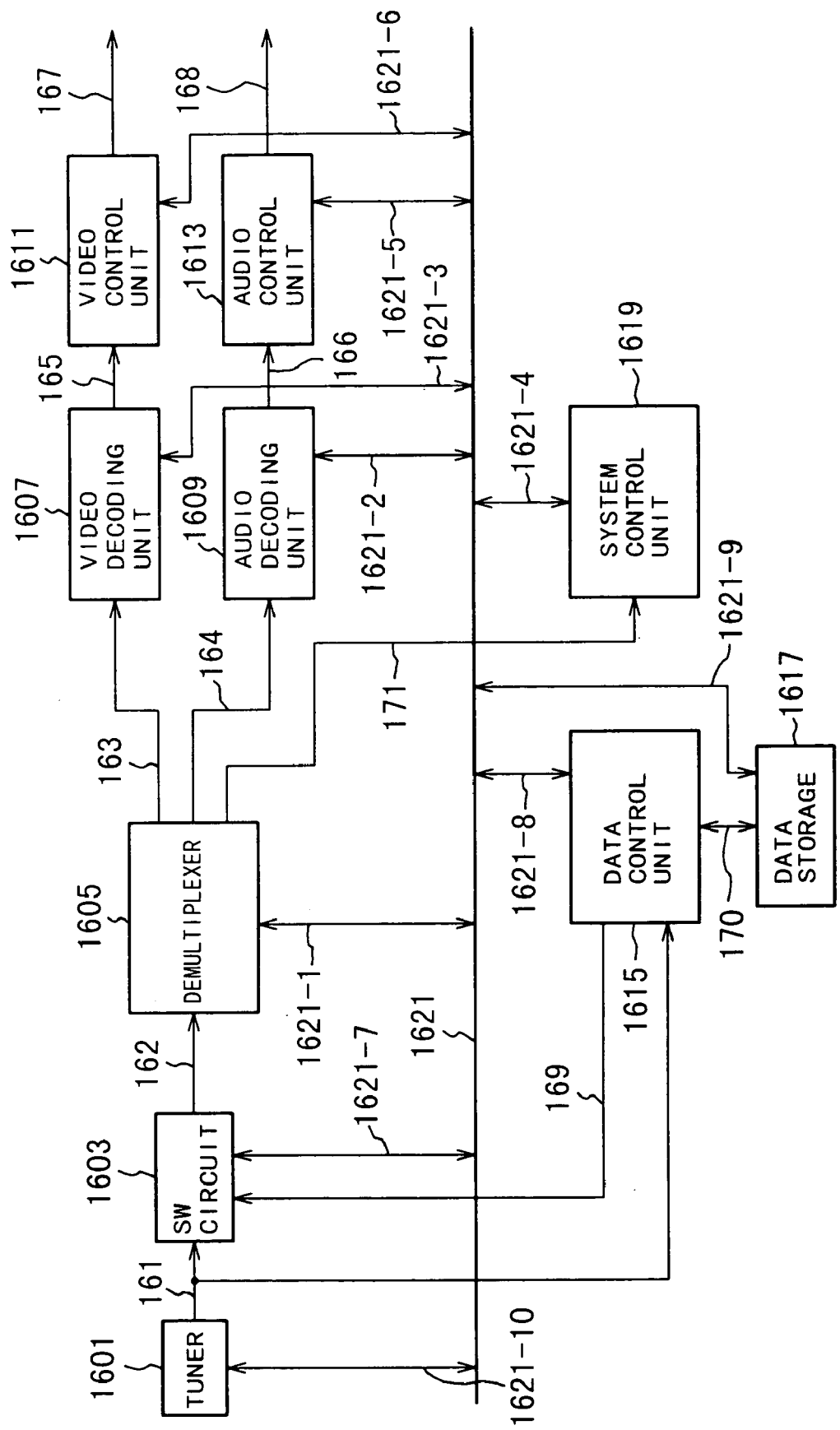
FIG. 16 is a block diagram of a conventional recording and reproducing apparatus.

Referring to FIGS. 15A and 15B, upon a record instruction from the operation unit 135, the system control unit 129 supplies a control signal to the data control unit 121. Upon reception of a record start instruction, the data control unit 121 first resets a variable c to 0 (S1501), the variable c being used for counting the number of detections of the TS packet having the unit start indicator bit "1", and then receives the TS packet data from the tuner 101.

After the TS packet data is received at S1501, the data control unit 121 detects PAT from the input TS packet data (S1502), and stores it in its inner register. Next, PMT is detected by referring to the stored PAT, and stored in the inner register, and by referring to the stored PMT information, PID of video and audio data of each program is discriminated (S1503). Thereafter, the input TS packet data is temporarily latched in the memory 119 made of FIFO (S1504).

Next, the data control unit 121 reads the top 24 bits of the TS packet stored in the memory 119 and latches them in its inner register (S1505). The lower 13 bits of the latched 24 bits are detected which are then compared with PID of the video and audio packet data of each program described in PMT to thereby judge whether the TS packet data is the video TS packet data (S1506). If not, it is recorded in the data storage 123 such as a hard disk and a magnetooptical disk (S1507). It is then judged whether there is a record end instruction (S1508). If not, the top 24 bits of the next TS packet are read and latched (S1504).

If the TS packet latched in the memory 119 is the video TS packet at S1506, it is judged from the unit start indicator bit at the upper tenth bit whether the TS packet contains the data at the start of the PES packet (S1509). If the unit start indicator bit is "0", the TS packet data is stored in the data storage 123 (S1507).

If it is judged at S1509 that the unit start indicator bit is "1", it is judged whether the variable c is 0 (S1510). If the variable c=0, the TS packet is recorded in the data storage 123 (S1514), an index is affixed to the TS packet, and the storage location information of the TS packet is output to the TSAT composition unit 133 (S1515). The variable c is then incremented by 1 to return to S1508 (S1516).

If the variable c is not 0 at S1510, it is judged although the TS packet contains the data at the start portion of PES, it is not a random access start candidate, and PID is not changed.

If the variable c is not 0 at S1510 and if the variable c is n-1 (S1511), the variable c is reset to 0 and the TS packet is recorded in the data storage 123 (S1512). If the variable c is not n-1, the variable c is incremented by 1, and the TS packet is recorded in the data storage 123 (S1513).

In this embodiment, the data control unit 121 operates in accordance with the flow chart of FIGS. 15A and 15B at n=2. Each time the TS packet having the unit start indicator bit "1" is detected twice, PID of the detected TS packet data is changed and stored in the data storage 123 shown in FIG. 1. In this manner, the time interval of 5 minutes for random access start candidate images in the embodiments shown in FIG. 4 can be doubled and set to 10 minutes.

The random access reproduction and ordinary reproduction of TS packet data of the fifth embodiment are similar to those of the first to fourth embodiments excepting that the time interval of random access start images is prolonged.

In this embodiment, the data control unit 121 operates in accordance with the flow chart of FIGS. 15A and 15B at n=2, and each time the TS packet having the unit start indicator bit "1" is detected twice, PID is changed. Instead, n may be set to 3 or 4 to change the time when PID is changed to the reproduction time management information. The time interval of random access start candidate images can therefore be set to a threefold of 15 minutes and a fourfold of 20 minutes as desired.

Also in this embodiment, although the data control unit 121 stores in advance the value n. Instead, a user may set the value n from the operation unit 135.

In this embodiment, when the TS packet data is recorded in the data storage, each time the TS packet having the payload_unit_start_indicator "1", i.e., the TS packet containing the start portion of each PES packet is detected n times, an index number is affixed to the video TS packet data, and the storage location of the TS packet as well as the index number is stored in TSAT. Therefore, the random access reproduction from the start portion of each PES packet can be executed in the unit of n PES packets.

Furthermore, since GUI images are displayed to support the random access reproduction by using the frame image in the start portion of each PES packet, the reproduction (random access reproduction) from a position desired by a user can be easily realized.

In the above embodiments, the present invention is applied to an apparatus for receiving digital TV broadcasting and recording and reproducing it. The invention can easily be applied to other apparatus for receiving, recording and reproducing a data train multiplexing a plurality of programs each constituted of a plurality of packets such as TS of MPEG 2, with similar expected advantages.

Next, a storage medium according to another embodiment of the invention will be described.

The system shown in FIG. 1 may be realized by hardware or by a computer system having a CPU and a memory. If the system is to be realized by a computer system, the memory constitutes the storage medium of the invention. This storage medium stores therein a program which executes a process for controlling the above-described operations in accordance with the flow charts shown in FIGS. 4, 8, 14 and 15 and the like of the above embodiments.

The storage medium may be: semiconductor memories such as a ROM and a RAM; an optical disk; a magnetooptical disk; and a magnetic storage medium which may be realized by a CD-ROM, a floppy disk, a magnetic tape, a magnetic card, a nonvolatile memory card or the like.

The object of the invention can be achieved with similar advantages by supplying the system shown in FIG. 1, another system or an apparatus with the storage medium storing software program codes realizing the functions of each embodiment described above, and by reading and executing the programs codes stored in the storage medium by the system or computer.

Also the object of the invention can be achieved with similar advantages, by realizing the functions of each embodiment by executing a portion or the whole of processes by an OS or the like running on a computer, or by realizing the functions of each embodiment by writing the program codes read from the storage medium into a memory of a function expansion board inserted into a computer or of a function expansion unit connected to the computer, and thereafter by executing a portion or the whole of actual processes by a CPU or the like of the function expansion board or function expansion unit.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
a receiving unit for receiving a data stream with a plurality of data stream packets including a plurality of elementary packets, multiplexing a plurality of program data;
a recording unit for recording the received data stream in a recording medium;
a control unit for detecting the data stream packets with a unit start indicator bit indicating that the data stream packet contains an elementary packet with a start data, and changing ID data of the data stream packet to time management information;
generating unit for generating a recording location table with respect to the time management information corresponding to management information for the recording medium; and
a storage unit for storing the data stream packets with ID data changed to the time management information,
wherein the generating unit generates the recording location table composed of original ID information, the time management information, and the management information for the recording medium, with respect to the data stream packets read from the storage unit.

2. A recording apparatus according to claim 1, wherein the recording medium is a hard disk and the management information is cluster information of the data stream packets in the hard disk.

3. A recording apparatus according to claim 1, wherein the data stream packets with a unit start indicator bit indicating that the data stream packet contains an elementary packet with a start data are transmitted at a predetermined interval by television broadcasting institutes.

4. A recording apparatus according to claim 1, further comprising:
- a demultiplexing unit for detecting image data from the data stream packets and outputting image elementary packets,
- a decoding unit for decoding image data of a designated image frame for the image elementary packets received from the demultiplexing unit; and
- an outputting unit for outputting the decoded image data to a display unit.

5. A recording method comprising:
- a receiving step of receiving a data stream with a plurality of data stream packets including a plurality of elementary packets, multiplexing a plurality of program data;
- a recording step of recording the received data stream in a recording medium;
- a control step of detecting the data stream packets with a unit start indicator bit indicating that the data stream packet contains an elementary packet with a start data, and changing ID data of the data stream packet to time management information;
- a generating step of generating a recording location table with respect to the time management information corresponding to management information for the recording medium; and
- a storage step for storing the data stream packets with ID data changed to the time management information;
- wherein the generating step generates the recording location table composed of original ID information, the time management information, and the management information for the recording medium, with respect to the data stream packets read in the storage step.

* * * * *

UNITED STATES PATENT AND TRADEMARK OFFICE
CERTIFICATE OF CORRECTION

PATENT NO. : 7,142,777 B1 Page 1 of 1
APPLICATION NO. : 09/510340
DATED : November 28, 2006
INVENTOR(S) : Tomoyuki Ohno It is certified that error appears in the above-identified patent and that said Letters Patent is hereby corrected as shown below:

COLUMN 4:
Line 2, "ad" should read --as--.
Line 36, "start indicator" should read --start_indicator--.

COLUMN 7:
Line 5, "vide" should read --video--.
Line 13, "vide" should read --video--.

COLUMN 8:
Line 18, "FIG. 6" should read --FIG. 6,--.

COLUMN 16:
Line 57, "generating unit" should read --a generating unit--.

COLUMN 18:
Line 14, "information;" should read --information,--.

Signed and Sealed this

Third Day of July, 2007

JON W. DUDAS
*Director of the United States Patent and Trademark Office*